United States Patent Office 2,803,651
Patented Aug. 20, 1957

2,803,651

PROCESS OF ISOLATION OF CHOLINE SALTS

Earl R. Whiston, Williamstown, and Hal E. Smith, Waverly, W. Va., assignors to American Cyanamid Company, New York, N. Y., a corporation of Maine No Drawing. Application January 6, 1955,
Serial No. 480,267

4 Claims. (Cl. 260—501)

This invention relates to an improved process of isolation of choline salts.

The general procedure for preparing choline base and its salts involves first preparing choline chloride by any of the conventional processes, treating the choline chloride to remove the sodium chloride by-product, as by treatment with silver oxide or silver hydroxide, leaving the choline base in solution, and then treating the solution with an appropriate acid to form the desired choline salt.

Certain choline salts, for example, choline dihydrogen citrate, are customarily isolated by centrifuging the product from a methanolic solution at a fairly low temperature, and then cooling the mother liquor to a lower temperature to get a second recovery by crystallizing the salt.

The present invention is based upon the discovery that by adding a quantity of isopropanol to the methanolic solution of the choline salt and then cooling as heretofore, recoveries of choline dihydrogen citrate, for example, are increased by 200–300%. This amazing increase in recovery by the use of a methanol-isopropanol mixture could not be predicted since it has been found that the use of isopropanol alone as the crystallizing liquid does not result in the obtaining of any crystalline dihydrogen citrate but only a gummy sticky mass is obtained instead.

The invention is not limited to the recovery of choline dihydrogen citrate as the recovery of other salts such as the phosphate, mucate, etc., can be accomplished in the same manner.

The quantity of isopropanol that is added to the methanol solution is not unduly critical. In general, we have found that from about 25% to 50% ratio by volume, based on the amount of methanol present, results in good yields of the choline salts. While slightly better yields appear to be obtainable by using the higher ratios, e. g., 50% isopropanol by volume, the cost of the extra isopropanol tends to offset somewhat the increased recovery of the salts.

The invention will be described in greater detail in conjunction with the following specific examples in which the parts are by weight unless otherwise specified.

EXAMPLE 1

Choline dihydrogen citrate

To 3780 parts of a 40% aqueous solution of choline base is added 2400 parts of citric acid anhydrous. The aqueous solution is clarified by activated charcoal and concentrated under vacuum to a viscous mass which is then dissolved in 828 parts of methanol. The methanolic solution is cooled to 30° C. and 1984 parts of choline dihydrogen citrate are recovered. The mother liquor is split into two 500 cc. aliquots. The first aliquot when cooled to 10° C. yields only 33.6 grams of choline dihydrogen citrate. To the second aliquot is added 125 cc. of isopropanol and the aliquot cooled to 10° C. 133.9 grams of choline dihydrogen citrate are obtained.

Similar recoveries are obtained by the use of isopropanol on plant batches of the mother liquor of choline dihydrogen citrate.

EXAMPLE 2

Choline dihydrogen citrate

A choline dihydrogen citrate mother liquor, prepared as in Example 1 and after the first isolation at 30° C., is split into three 100 cc. aliquots. To the first aliquot 50 cc. of isopropanol is added, and the solution cooled to 10° C. The recovery of choline dihydrogen citrate is 47.6 grams. To the second aliquot, 25 cc. of isopropanol is added, and the solution is cooled to 10° C. The recovery of choline dihydrogen citrate is 44.0 grams. The third aliquot is cooled to 10° C. without the addition of any isopropanol. The recovery of choline dihydrogen citrate is 27.3 grams.

EXAMPLE 3

Choline phosphate

To 1211 parts of a 20% aqueous solution of choline base is added 196 parts of phosphoric acid. The water is essentially removed by evaporation under vacuum until only a viscous mass remains. The choline phosphate is taken up in 100 ml. of methanol and a white crystalline product is isolated after cooling to 9° C. It is washed with 50 ml. of methanol and the wash is then combined with the mother liquor. To this methanolic solution, 100 cc. of isopropanol is added. The first methanol isolation yields 188.8 grams of high quality choline phosphate. The second isopropanol-methanol isolation yields an additional 134.4 grams of high quality choline phosphate.

EXAMPLE 4

Dicholine mucate

To 2422 parts of a 40% aqueous solution of choline base is added 578 parts of mucic acid. The solution is evaporated to produce a viscous mass. The mass is dissolved in 350 parts of methanol and a satisfactory isolation is made by the slow addition of an equal volume of isopropanol.

We claim:

1. In the process of recovering choline salts selected from the group consisting of choline dihydrogen citrate, choline phosphate, and dicholine mucate by crystallization from methanolic solutions thereof, the improvement which comprises adding from about 25% to about 50% isopropanol by volume to the methanolic solution.

2. The process according to claim 1 in which the choline salt is choline dihydrogen citrate.

3. The process according to claim 1 in which the choline salt is choline phosphate.

4. The process according to claim 1 in which the choline salt is dicholine mucate.

References Cited in the file of this patent

UNITED STATES PATENTS 2,623,901     Klein et al.    ---------- Dec. 30, 1952

OTHER REFERENCES

Renshaw: J. Am. Chem. Soc. 32 (1910), 128–30.
Merck Index, 6th ed. (1952), pp. 238–9.